(12) United States Patent
Xu

(10) Patent No.: US 10,385,477 B2
(45) Date of Patent: Aug. 20, 2019

(54) METHOD FOR PREPARING NYLON YARNS

(71) Applicant: FLOURISH INNOVATIVE TEXTILE CO., LTD., Beijing (CN)

(72) Inventor: Dongdong Xu, Beijing (CN)

(73) Assignee: FLOURISH INNOVATIVE TEXTILE CO., LTD., Beijing (CN)

( * ) Notice: Subject to any disclaimer, the term of this patent is extended or adjusted under 35 U.S.C. 154(b) by 74 days.

(21) Appl. No.: 15/877,390

(22) Filed: Jan. 23, 2018

(65) Prior Publication Data

US 2019/0226121 A1    Jul. 25, 2019

(51) Int. Cl.
| | |
|---|---|
| A01N 25/10 | (2006.01) |
| A01N 59/20 | (2006.01) |
| B29B 9/02 | (2006.01) |
| B29B 9/06 | (2006.01) |
| C08J 3/22 | (2006.01) |
| C08K 3/015 | (2018.01) |
| D01D 5/088 | (2006.01) |
| D01D 5/096 | (2006.01) |
| D01D 7/00 | (2006.01) |
| D01F 1/04 | (2006.01) |
| D01F 1/06 | (2006.01) |
| D01F 1/10 | (2006.01) |
| D01F 6/60 | (2006.01) |
| D01D 1/02 | (2006.01) |
| D01D 5/02 | (2006.01) |
| D01D 10/02 | (2006.01) |
| D01D 10/04 | (2006.01) |
| D06M 11/13 | (2006.01) |
| D06M 10/10 | (2006.01) |
| D06M 23/08 | (2006.01) |
| D06M 11/05 | (2006.01) |
| D06M 101/34 | (2006.01) |
| C08K 3/08 | (2006.01) |

(52) U.S. Cl.
CPC ................ $D01D$ $1/02$ (2013.01); $D01D$ $5/02$ (2013.01); $D01D$ $10/02$ (2013.01); $D01D$ $10/0409$ (2013.01); $D01F$ $1/103$ (2013.01); $D06M$ $10/10$ (2013.01); $D06M$ $11/05$ (2013.01); $D06M$ $11/13$ (2013.01); $D06M$ $23/08$ (2013.01); $C08K$ $2003/085$ (2013.01); $D06M$ $2101/34$ (2013.01)

(58) Field of Classification Search
CPC .......... A01N 25/10; A01N 59/20; B29B 9/02; B29B 9/06; C08J 3/22; C08K 3/015; C08K 2003/085; D01D 5/088; D01D 5/096; D01D 7/00; D01D 10/0409; D01F 1/04; D01F 1/06; D01F 1/10; D01F 1/103; D01F 6/60
USPC ...... 264/141, 142, 143, 211, 211.12, 211.14, 264/211.15, 211.22, 211.23, 331.19; 514/499; 523/122, 351; 524/413, 606, 524/781

See application file for complete search history.

(56) References Cited

U.S. PATENT DOCUMENTS

2009/0281210 A1 * 11/2009 Aramaki .................. C08J 3/226
523/351
2016/0255838 A1 * 9/2016 Xu ........................ D01F 1/103

FOREIGN PATENT DOCUMENTS

| CN | 101705527 | 5/2010 | |
| WO | WO-2015149412 A1 * | 10/2015 | ............. D01F 1/103 |

* cited by examiner

Primary Examiner — Leo B Tentoni
(74) Attorney, Agent, or Firm — JCIPRNET

(57) ABSTRACT

The invention discloses a method for preparing nylon yarns. The method comprises the following steps: mixing, blending, spinning, cooling and then winding an organic copper complex, color masterbatches and PA6 slices into bobbins, wherein the organic copper complex is obtained after a coordinated ionic liquid reacts with copper powder oxidized by an oxidant, and the color masterbatches are obtained through blending granulation of the PA6 slices, germanium powder slurry and modified negative ion far-infrared powder. The method has the beneficial effect that the nylon yarns obtained by the preparation method are healthier and safer to the human body.

10 Claims, No Drawings

METHOD FOR PREPARING NYLON YARNS

BACKGROUND OF THE INVENTION

Technical Field

The invention relates to a method for preparing yarns, in particular to a method for preparing nylon yarns.

Background Art

Nylon, whose chemical name is polyamide, is the first synthetic fiber in the world. The outstanding advantage of fibers made from nylon is that wearability is higher than all other fibers, 10 times higher than cotton and 20 times higher than wool. With the improvement of the living standard of people, people are no longer satisfied with nylon only having remarkable wearability.

Chinese patent with publication No. CN101705527A discloses an antibacterial antistatic multifunctional nylon 6 fiber and preparation and an application thereof. The nylon 6 fiber, also named PA6 fiber, is added with nano zinc oxide containing silver ions on the basis of nylon 6, and can not only reduce the volume resistivity and enhance the antistatic property, but also improve the antibacterial property.

However, the PA6 fiber is mainly used for wearable textiles. As silver is not a trace element necessary for the human body, long-term wearing of textiles with silver ions will allow silver ions to enter the human body via skin and accumulate in the body, which is bad for health. In fact, in November 2013, the United States has publicly announced the restriction of the use of antibacterial nanosilver for textiles. Therefore, how to improve the antibacterial property of nylon yarns without the use of silver is an urgent problem to be solved.

SUMMARY OF THE INVENTION

The invention aims to provide a method for preparing nylon yarns. The nylon yarns obtained by the preparation method are healthier and safer to the human body.

The technical purpose of the invention is achieved by the following technical solutions:

A method for preparing the nylon yarns comprises the following steps:

Step 1: mixing and blending an organic copper complex, color masterbatches and PA6 slices for preparing the nylon yarns to form a spinning melt; and Step 2: spinning, cooling and then winding the spinning melt into bobbins.

The organic copper complex is prepared according to the following steps:

Step A: uniformly mixing urea, caprolactam and acetamide, and then conducting heating and heat preservation till the caprolactam and the urea are uniformly melted and liquefied, so as to obtain a coordinated ionic liquid; and Step B: adding a coordinated solid mixture containing sodium chlorate, potassium permanganate, sodium peroxide and copper powder to the coordinated ionic liquid to be stirred uniformly for reacting, and then cooling and pouring into pure water to obtain the organic copper complex.

The color masterbatches are prepared according to the following steps:

S1: mixing germanium powder with a dispersing agent polyethylene wax and a coupling agent titanate, uniformly stirring the mixture, and conducting grinding after mixing to obtain germanium powder slurry;

S2: mixing negative ion powder, far-infrared powder, a silane coupling agent and the dispersing agent polyethylene wax, and uniformly stirring the mixture to make the negative ion powder and the far-infrared powder fully dispersed, so as to obtain modified negative ion far-infrared powder;

S3: mixing a PA6 slices for preparing the color masterbatches, the germanium powder slurry and the modified negative ion far-infrared powder; and S4: drying and conducting blending granulation.

Further, the weight ratio of the organic copper complex to the color masterbatches to the PA6 slices for preparing the nylon yarns in step 1 is 0.5-2:5-10:90-95.

Further, the organic copper complex, the color masterbatches and the PA6 slices for preparing the nylon yarns are mixed and melted by a twin-screw extruder in step 1, the temperature in each zone of the twin-screw extruder is set at 260-273° C., the screw diameter of the twin-screw extruder is 67 mm, and the ratio of the screw length to the screw diameter is 36:1.

Further, the spinning melt in step 2 is spun through a spinneret, the pressure of the spinneret is 15-16 MPa, the side blowing speed is 40-42 m/min, the side blowing temperature is 19-20° C., the side blowing humidity is 80-85%, the spinning temperature is 259-265° C., the spinning pressure is 12-18 cN, and the spinning speed is 4000-4500 m/min; and in the spinning process, two nozzles are used for spraying a chemical fiber oiling agent emulsion with a concentration of 10-12 wt %, and the distance between the spinneret and the two nozzles is 1340-1360 mm.

Further, the PA6 slices for preparing the nylon yarns and the PA6 slices for preparing the color masterbatches are all spin-grade PA6 slices with relative viscosity of 2.5.

Further, in step A, the weight ratio of the urea to the caprolactam to the acetamide is 1:0.2-0.4:0.2-0.4, the heating temperature is 100-120° C., and after the temperature reaches 100-120° C., the heat preservation is conducted for 0.5-1 h till the caprolactam and the urea are uniformly melted and liquefied; in step B, the weight ratio of the sodium chlorate to the potassium permanganate to the sodium peroxide to the copper powder is 1:1-2:1-2:2.5-2.9; and the weight ratio of the coordinated solid mixture to the coordinated ionic liquid is 1:3-3.5.

Further, in S1, the weight ratio of the germanium powder to the dispersing agent polyethylene wax to the coupling agent titanate is 1:0.1-0.3:0.4-0.6, and grinding time is 10-20 min.

Further, in S2, the weight ratio of the negative ion powder to the far-infrared powder to the silane coupling agent to the dispersing agent polyethylene wax is 1:1-1.2:0.2-0.6:0.1-0.3.

Further, in S3, the weight ratio of the PA6 slices for preparing the color masterbatches to the germanium powder slurry to the modified negative ion far-infrared powder is 10:0.01-0.02:2-2.1.

Further, in S4, the drying temperature is 100-105° C., and blending is conducted by a screw extruder at 260-300° C.

In summary, the method has the following beneficial effects:

1. Copper has a good antibacterial effect and can replace silver ions to play an antibacterial effect. Meanwhile, copper is a trace element necessary for the human body. Copper ions entering the human body can contribute to the normal metabolism of the human body and make the human body healthier and safer. Meanwhile, compared with silver, the use of copper can also reduce the production cost.

2. Copper ions exist in polyamide fibers in an ionic state, and the antibacterial effect is remarkable. Furthermore, the organic copper complex is chemically chelated with fiber molecules, and the organic copper complex on the surfaces of the polyamide fibers is not prone to falling off, which ensures the persistence of the antibacterial function and other functions of the fibers.

3. The negative ion powder, the far-infrared powder and the germanium powder can realize the healthcare function independently, furthermore, the negative ion powder can generate negative ions, the far-infrared powder emits far-infrared rays to heat the polyamide fibers and further stimulate the germanium powder to release electrons, and the blood circulation promoting and anti-fatigue functions of the polyamide fibers are remarkably enhanced.

4. Monovalent copper is more deformable than divalent copper, and the covalency of the coordinated bond of monovalent copper is stronger. Therefore, the stability of a monovalent copper complex is higher than that of a bivalent copper complex. Negative ions released by the negative ion powder help to prevent monovalent copper from being oxidized into divalent copper, thereby enhancing the antibacterial property.

DETAILED DESCRIPTION OF THE INVENTION

Embodiments 1-5 are embodiments about preparation of an organic copper complex.

Embodiment 1

A method for preparing the organic copper complex comprises the steps of:

Step A: uniformly mixing urea, caprolactam and acetamide according to the weight ratio of urea to caprolactam to acetamide of 1:0.2:0.2, then conducting heating to 100° C., and conducting heat preservation for 1 h till the caprolactam and the urea are uniformly melted and liquefied, so as to obtain a coordinated ionic liquid;

Step B: weighing sodium chlorate, potassium permanganate, sodium peroxide and copper powder according to the weight ratio of the sodium chlorate to the potassium permanganate to the sodium peroxide to the copper powder of 1:1:1:2.5, so as to obtain a coordinated solid mixture, adding the coordinated solid mixture to the coordinated ionic liquid according to the weight ratio of the coordinated solid mixture to the coordinated ionic liquid of 1:3, uniformly stirring the mixture for reacting, so as to make the copper powder completely oxidized into monovalent ions and form coordinated ions with the above organic substances in the coordinated ionic liquid, cooling and then pouring into pure water, and placing for 3 days without the occurrence of precipitation or discoloration, so that the organic copper complex is obtained.

Embodiment 2

A method for preparing the organic copper complex comprises the steps of:

Step A: uniformly mixing urea, caprolactam and acetamide according to the weight ratio of urea to caprolactam to acetamide of 1:0.3:0.4, then conducting heating to 120° C., and conducting heat preservation for 0.5 h till the caprolactam and the urea are uniformly melted and liquefied, so as to obtain a coordinated ionic liquid;

Step B: weighing sodium chlorate, potassium permanganate, sodium peroxide and copper powder according to the weight ratio of the sodium chlorate to the potassium permanganate to the sodium peroxide to the copper powder of 1:2:1:2.9, so as to obtain a coordinated solid mixture, adding the coordinated solid mixture to the coordinated ionic liquid according to the weight ratio of the coordinated solid mixture to the coordinated ionic liquid of 1:3.5, uniformly stirring the mixture for reacting, so as to make the copper powder completely oxidized into monovalent ions and form coordinated ions with the above organic substances in the coordinated ionic liquid, cooling and then pouring into pure water, and placing for 3 days without the occurrence of precipitation or discoloration, so that the organic copper complex is obtained.

Embodiment 3

A method for preparing the organic copper complex comprises the steps of:

Step A: uniformly mixing urea, caprolactam and acetamide according to the weight ratio of urea to caprolactam to acetamide of 1:0.4:0.4, then conducting heating to 120° C., and conducting heat preservation for 0.5 h till the caprolactam and the urea are uniformly melted and liquefied, so as to obtain a coordinated ionic liquid;

Step B: weighing sodium chlorate, potassium permanganate, sodium peroxide and copper powder according to the weight ratio of the sodium chlorate to the potassium permanganate to the sodium peroxide to the copper powder of 1:1.5:2:2.7, so as to obtain a coordinated solid mixture, adding the coordinated solid mixture to the coordinated ionic liquid according to the weight ratio of the coordinated solid mixture to the coordinated ionic liquid of 1:3, uniformly stirring the mixture for reacting, so as to make the copper powder completely oxidized into monovalent ions and form coordinated ions with the above organic substances in the coordinated ionic liquid, cooling and then pouring into pure water, and placing for 3 days without the occurrence of precipitation or discoloration, so that the organic copper complex is obtained.

Embodiment 4

A method for preparing the organic copper complex comprises the steps of:

Step A: uniformly mixing urea, caprolactam and acetamide according to the weight ratio of urea to caprolactam to acetamide of 1:0.3:0.2, then conducting heating to 100° C., and conducting heat preservation for 1 h till the caprolactam and the urea are uniformly melted and liquefied, so as to obtain a coordinated ionic liquid;

Step B: weighing sodium chlorate, potassium permanganate, sodium peroxide and copper powder according to the weight ratio of the sodium chlorate to the potassium permanganate to the sodium peroxide to the copper powder of 1:2:1.5:2.5, so as to obtain a coordinated solid mixture, adding the coordinated solid mixture to the coordinated ionic liquid according to the weight ratio of the coordinated solid mixture to the coordinated ionic liquid of 1:3.5, uniformly stirring the mixture for reacting, so as to make the copper powder completely oxidized into monovalent ions and form coordinated ions with the above organic substances in the coordinated ionic liquid, cooling and then pouring into pure water, and placing for 3 days without the occurrence of precipitation or discoloration, so that the organic copper complex is obtained.

Embodiment 5

A method for preparing the organic copper complex comprises the steps of:

Step A: uniformly mixing urea, caprolactam and acetamide according to the weight ratio of urea to caprolactam to acetamide of 1:0.2:0.3, then conducting heating to 120° C., and conducting heat preservation for 0.5 h till the caprolactam and the urea are uniformly melted and liquefied, so as to obtain a coordinated ionic liquid;

Step B: weighing sodium chlorate, potassium permanganate, sodium peroxide and copper powder according to the weight ratio of the sodium chlorate to the potassium permanganate to the sodium peroxide to the copper powder of 1:1:2:2.5, so as to obtain a coordinated solid mixture, adding the coordinated solid mixture to the coordinated ionic liquid according to the weight ratio of the coordinated solid mixture to the coordinated ionic liquid of 1:3, uniformly stirring the mixture for reacting, so as to make the copper powder completely oxidized into monovalent ions and form coordinated ions with the above organic substances in the coordinated ionic liquid, cooling and then pouring into pure water, and placing for 3 days without the occurrence of precipitation or discoloration, so that the organic copper complex is obtained.

Embodiments 6-10 are embodiments about preparation of color masterbatches.

Embodiment 6

A method for preparing the color masterbatches comprises the following steps:

S1: mixing germanium powder with a dispersing agent polyethylene wax A1-5 and a coupling agent titanate TMC-981 according to the weight ratio of the germanium powder to the dispersing agent polyethylene wax A1-5 to the coupling agent titanate TMC-981 of 1:0.1:0.4, uniformly stirring the mixture, and conducting grinding for 10 min after mixing to obtain germanium powder slurry;

S2: mixing negative ion powder JDGFP-001, far-infrared powder JDGYP-001, a silane coupling agent JH-S69 and the dispersing agent polyethylene wax A1-5 according to the weight ratio of the negative ion powder JDGFP-001 to the far-infrared powder JDGYP-001 to the silane coupling agent JH-S69 to the dispersing agent polyethylene wax A1-5 of 1:1:0.2:0.1, and uniformly stirring the mixture to make the negative ion powder and the far-infrared powder fully dispersed, so as to obtain modified negative ion far-infrared powder;

S3: mixing the PA6 slices for preparing the color masterbatches, the germanium powder slurry and the modified negative ion far-infrared powder according to the weight ratio of the PA6 slices for preparing the color masterbatches to the germanium powder slurry to the modified negative ion far-infrared powder of 10:0.01:2; and S4: drying at 100° C. and conducting blending granulation at 300° C. with a screw extruder.

Embodiment 7

A method for preparing the color masterbatches comprises the following steps:

S1: mixing germanium powder with a dispersing agent polyethylene wax A1-5 and a coupling agent titanate TMC-981 according to the weight ratio of the germanium powder to the dispersing agent polyethylene wax A1-5 to the coupling agent titanate TMC-981 of 1:0.2:0.5, uniformly stirring the mixture, and conducting grinding for 15 min after mixing to obtain germanium powder slurry;

S2: mixing negative ion powder JDGFP-001, far-infrared powder JDGYP-001, a silane coupling agent JH-S69 and the dispersing agent polyethylene wax A1-5 according to the weight ratio of the negative ion powder JDGFP-001 to the far-infrared powder JDGYP-001 to the silane coupling agent JH-S69 to the dispersing agent polyethylene wax A1-5 of 1:1.2:0.6:0.3, and uniformly stirring the mixture to make the negative ion powder and the far-infrared powder fully dispersed, so as to obtain modified negative ion far-infrared powder;

S3: mixing the PA6 slices for preparing the color masterbatches, the germanium powder slurry and the modified negative ion far-infrared powder according to the weight ratio of the PA6 slices for preparing the color masterbatches to the germanium powder slurry to the modified negative ion far-infrared powder of 10:0.02:2.1; and S4: drying at 105° C. and conducting blending granulation at 260° C. with a screw extruder.

Embodiment 8

A method for preparing the color masterbatches comprises the following steps:

S1: mixing germanium powder with a dispersing agent polyethylene wax A1-5 and a coupling agent titanate TMC-981 according to the weight ratio of the germanium powder to the dispersing agent polyethylene wax A1-5 to the coupling agent titanate TMC-981 of 1:0.3:0.6, uniformly stirring the mixture, and conducting grinding for 20 min after mixing to obtain germanium powder slurry;

S2: mixing negative ion powder JDGFP-001, far-infrared powder JDGYP-001, a silane coupling agent JH-S69 and the dispersing agent polyethylene wax A1-5 according to the weight ratio of the negative ion powder JDGFP-001 to the far-infrared powder JDGYP-001 to the silane coupling agent JH-S69 to the dispersing agent polyethylene wax A1-5 of 1:1.1:0.4:0.2, and uniformly stirring the mixture to make the negative ion powder and the far-infrared powder fully dispersed, so as to obtain modified negative ion far-infrared powder;

S3: mixing the PA6 slices for preparing the color masterbatches, the germanium powder slurry and the modified negative ion far-infrared powder according to the weight ratio of the PA6 slices for preparing the color masterbatches to the germanium powder slurry to the modified negative ion far-infrared powder of 10:0.01:2.1; and S4: drying at 102° C. and conducting blending granulation at 270° C. with a screw extruder.

Embodiment 9

A method for preparing the color masterbatches comprises the following steps:

S1: mixing germanium powder with a dispersing agent polyethylene wax A1-5 and a coupling agent titanate TMC-981 according to the weight ratio of the germanium powder to the dispersing agent polyethylene wax A1-5 to the coupling agent titanate TMC-981 of 1:0.2:0.4, uniformly stirring the mixture, and conducting grinding for 15 min after mixing to obtain germanium powder slurry;

S2: mixing negative ion powder JDGFP-001, far-infrared powder JDGYP-001, a silane coupling agent JH-S69 and the dispersing agent polyethylene wax A1-5 according to the weight ratio of the negative ion powder JDGFP-001 to the far-infrared powder JDGYP-001 to the silane coupling agent JH-S69 to the dispersing agent polyethylene wax A1-5 of 1:1:0.4:0.2, and uniformly stirring the mixture to make the negative ion powder and the far-infrared powder fully dispersed, so as to obtain modified negative ion far-infrared powder;

S3: mixing the PA6 slices for preparing the color masterbatches, the germanium powder slurry and the modified negative ion far-infrared powder according to the weight ratio of the PA6 slices for preparing the color masterbatches to the germanium powder slurry to the modified negative ion far-infrared powder of 10:0.02:2; and S4: drying at 103° C. and conducting blending granulation at 280° C. with a screw extruder.

Embodiment 10

A method for preparing the color masterbatches comprises the following steps:

S1: mixing germanium powder with a dispersing agent polyethylene wax A1-5 and a coupling agent titanate TMC-981 according to the weight ratio of the germanium powder to the dispersing agent polyethylene wax A1-5 to the coupling agent titanate TMC-981 of 1:0.3:0.6, uniformly stirring the mixture, and conducting grinding for 20 min after mixing to obtain germanium powder slurry;

S2: mixing negative ion powder JDGFP-001, far-infrared powder JDGYP-001, a silane coupling agent JH-S69 and the dispersing agent polyethylene wax A1-5 according to the weight ratio of the negative ion powder JDGFP-001 to the far-infrared powder JDGYP-001 to the silane coupling agent JH-S69 to the dispersing agent polyethylene wax A1-5 of 1:1.1:0.2:0.2, and uniformly stirring the mixture to make the negative ion powder and the far-infrared powder fully dispersed, so as to obtain modified negative ion far-infrared powder;

S3: mixing the PA6 slices for preparing the color masterbatches, the germanium powder slurry and the modified negative ion far-infrared powder according to the weight ratio of the PA6 slices for preparing the color masterbatches to the germanium powder slurry to the modified negative ion far-infrared powder of 10:0.01:2.1; and S4: drying at 104° C. and conducting blending granulation at 290° C. with a screw extruder.

Embodiments 11-15 are embodiments about preparation of nylon yarns.

Embodiment 11

An organic copper complex used in Embodiment 11 is the organic copper complex prepared according to Embodiment 1; and color masterbatches used in Embodiment 11 are the color masterbatches prepared according to Embodiment 6.

A method for preparing the nylon yarns comprises the following steps:

Step 1: mixing and blending the organic copper complex, the color masterbatches and PA6 slices for preparing the nylon yarns in a twin-screw extruder according to the weight ratio of the organic copper complex to the color masterbatches to the PA6 slices for preparing the nylon yarns of 0.5:5:90 to form a spinning melt, wherein the temperature in each zone of the twin-screw extruder is set at 260° C., the screw diameter of the twin-screw extruder is 67 mm, and the ratio of the screw length to the screw diameter is 36:1;

Step 2: spinning the spinning melt with a spinneret, cooling and winding into bobbins, wherein the pressure of the spinneret is 15 MPa, the side blowing speed is 40 m/min, the side blowing temperature is 19° C., the side blowing humidity is 85%, the spinning temperature is 259° C., the spinning pressure is 12 cN, and the spinning speed is 4000 m/min; and in the spinning process, two nozzles are used for spraying a chemical fiber oiling agent emulsion with a concentration of 10 wt %, and the distance between the spinneret and the two nozzles is 1340 mm.

Embodiment 12

An organic copper complex used in Embodiment 12 is the organic copper complex prepared according to Embodiment 2; and color masterbatches used in Embodiment 12 are the color masterbatches prepared according to Embodiment 7.

A method for preparing the nylon yarns comprises the following steps:

Step 1: mixing and blending the organic copper complex, the color masterbatches and PA6 slices for preparing the nylon yarns in a twin-screw extruder according to the weight ratio of the organic copper complex to the color masterbatches to the PA6 slices for preparing the nylon yarns of 2:10:95 to form a spinning melt, wherein the temperature in each zone of the twin-screw extruder is set at 265° C., the screw diameter of the twin-screw extruder is 67 mm, and the ratio of the screw length to the screw diameter is 36:1;

Step 2: spinning the spinning melt with a spinneret, cooling and winding into bobbins, wherein the pressure of the spinneret is 16 MPa, the side blowing speed is 42 m/min, the side blowing temperature is 20° C., the side blowing humidity is 80%, the spinning temperature is 260° C., the spinning pressure is 14 cN, and the spinning speed is 4100 m/min; and in the spinning process, two nozzles are used for spraying a chemical fiber oiling agent emulsion with a concentration of 11 wt %, and the distance between the spinneret and the two nozzles is 1345 mm.

Embodiment 13

An organic copper complex used in Embodiment 13 is the organic copper complex prepared according to Embodiment 3; and color masterbatches used in Embodiment 13 are the color masterbatches prepared according to Embodiment 8.

A method for preparing the nylon yarns comprises the following steps:

Step 1: mixing and blending the organic copper complex, the color masterbatches and PA6 slices for preparing the nylon yarns in a twin-screw extruder according to the weight ratio of the organic copper complex to the color masterbatches to the PA6 slices for preparing the nylon yarns of 1:6:93 to form a spinning melt, wherein the temperature in each zone of the twin-screw extruder is set at 263° C., the screw diameter of the twin-screw extruder is 67 mm, and the ratio of the screw length to the screw diameter is 36:1;

Step 2: spinning the spinning melt with a spinneret, cooling and winding into bobbins, wherein the pressure of the spinneret is 15 MPa, the side blowing speed is 40 m/min, the side blowing temperature is 20° C., the side blowing humidity is 82%, the spinning temperature is 261° C., the spinning pressure is 15 cN, and the spinning speed is 4200 m/min; and in the spinning process, two nozzles are used for spraying a chemical fiber oiling agent emulsion with a concentration of 12 wt %, and the distance between the spinneret and the two nozzles is 1350 mm.

Embodiment 14

An organic copper complex used in Embodiment 14 is the organic copper complex prepared according to Embodiment 4; and color masterbatches used in Embodiment 14 are the color masterbatches prepared according to Embodiment 9.

A method for preparing the nylon yarns comprises the following steps:

Step 1: mixing and blending the organic copper complex, the color masterbatches and PA6 slices for preparing the nylon yarns in a twin-screw extruder according to the weight ratio of the organic copper complex to the color masterbatches to the PA6 slices for preparing the nylon yarns of 1.5:8:92 to form a spinning melt, wherein the temperature in each zone of the twin-screw extruder is set at 268° C., the screw diameter of the twin-screw extruder is 67 mm, and the ratio of the screw length to the screw diameter is 36:1;

Step 2: spinning the spinning melt with a spinneret, cooling and winding into bobbins, wherein the pressure of the spinneret is 16 MPa, the side blowing speed is 41 m/min, the side blowing temperature is 19° C., the side blowing humidity is 83%, the spinning temperature is 263° C., the spinning pressure is 16 cN, and the spinning speed is 4300 m/min; and in the spinning process, two nozzles are used for spraying a chemical fiber oiling agent emulsion with a concentration of 11 wt %, and the distance between the spinneret and the two nozzles is 1355 mm.

Embodiment 15

An organic copper complex used in Embodiment 15 is the organic copper complex prepared according to Embodiment 5; and color masterbatches used in Embodiment 15 are the color masterbatches prepared according to Embodiment 10.

A method for preparing the nylon yarns comprises the following steps:

Step 1: mixing and blending the organic copper complex, the color masterbatches and PA6 slices for preparing the nylon yarns in a twin-screw extruder according to the weight ratio of the organic copper complex to the color masterbatches to the PA6 slices for preparing the nylon yarns of 1:7:91 to form a spinning melt, wherein the temperature in each zone of the twin-screw extruder is set at 273° C., the screw diameter of the twin-screw extruder is 67 mm, and the ratio of the screw length to the screw diameter is 36:1;

Step 2: spinning the spinning melt with a spinneret, cooling and winding into bobbins, wherein the pressure of the spinneret is 15 MPa, the side blowing speed is 40 m/min, the side blowing temperature is 20° C., the side blowing humidity is 84%, the spinning temperature is 265° C., the spinning pressure is 18 cN, and the spinning speed is 4500 m/min; and in the spinning process, two nozzles are used for spraying a chemical fiber oiling agent emulsion with a concentration of 12 wt %, and the distance between the spinneret and the two nozzles is 1360 mm.

The chemical fiber oiling agent emulsion of the Embodiments 11-15 is prepared by adding the chemical fiber oiling agent into the water and then stirring uniformly. The concentration of the chemical fiber oiling agent emulsion is the mass fraction of the chemical fiber oiling agent in the emulsion.

The chemical fiber oiling agent used in Embodiments 11-15 comprises, by weight, 40 parts of trimethylhexanol ethylene oxide propylene oxide copolyether, 25 parts of dodecanol polyoxyethylene ether, 20 parts of nonylphenol polyoxyethylene ether, 10 parts of polyoxyethylene PEG-400 laurate ether ester, 1 part of fatty alcohol polyoxyethylene ether phosphate, 2 parts of water and 2 parts of fatty amine polyoxyethylene ether.

The chemical fiber oiling agent is prepared according to the steps of uniformly mixing the trimethylhexanol ethylene oxide propylene oxide copolyether, the dodecanol polyoxyethylene ether, the nonylphenol polyoxyethylene ether, the polyoxyethylene PEG-400 laurate ether ester and the water at normal temperature, and then adding the fatty alcohol polyoxyethylene ether phosphate and the fatty amine polyoxyethylene ether to be uniformly mixed at 40° C.

Raw material sources are as follows:

The PA6 slices for preparing the nylon yarns and the PA6 slices for preparing the color masterbatches are all a spin-grade PA6 slices with relative viscosity of 2.5 and manufactured by Yueyang Petrochemical Corporation;

the negative ion powder JDGFP-001 and the far-infrared powder JDGYP-001 were purchased from Jinda Nano Tech. (Xiamen) Co., Ltd.; the silane coupling agent JH-S69 was purchased from Jingzhou Jianghan Fine Chemical Co., Ltd.; the dispersing agent polyethylene wax A1-5 was purchased from Gaoyao Zhilian Plastics Co., Ltd.; and other raw materials are all commercially available products.

Antibacterial Tests

Antibacterial tests were conducted on nylon yarns of Embodiments 11-15 with reference to GB/T 20994.2-2007 "Textiles-Evaluation for antibacterial activity-Part 2: Absorption method" and recorded.

TABLE 1

Embodiments 11-15 antibacterial test record sheet

| | Staphylococcus aureus antibacterial rate/% | Klebsiella pneumoniae/% |
|---|---|---|
| Embodiment 11 | >99% | >99% |
| Embodiment 12 | >99% | >99% |
| Embodiment 13 | >99% | >99% |
| Embodiment 14 | >99% | >99% |
| Embodiment 15 | >99% | >99% |

As can be seen from Table 1, the nylon yarns prepared according to Embodiments 11-15 have a good antibacterial effect on *staphylococcus aureus* and *klebsiella pneumoniae*, and Gram-positive bacteria and Gram-negative bacteria can be well resisted when the prepared nylon yarns are applied to a surface.

Durability Tests

Step 1: washing the nylon yarns prepared according to Embodiments 11-15 50 times with reference to GB/T 12490-2014 "Textiles-Tests for colour fastness-Colour fastness to domestic and commercial laundering", and then conducting antibacterial tests on the nylon yarns prepared according to Embodiments 11-15 with reference to GB/T 20994.2-2007 "Textiles-Evaluation for antibacterial activity-Part 2: Absorption method" and recording results.

Step 2: Changing the number of times of washing to 100 times and 500 times, with other operation the same as step 1;

Step 3: irradiating the nylon yarns prepared according to Embodiments 11-15 by using an air-cooled xenon arc lamp device to simulate solar radiation, wherein irradiation amount is 42 W/m$^2$, the distance between the air-cooled xenon arc lamp device and a sample surface is 5 cm, and irradiation time is 12 h;

Step 4: repeating step 2 with irradiation time being changed to 24 h and 48 h.

TABLE 2

Embodiments 11-15 durability test record sheet (washing part)

| | 50 times | | 100 times | | 500 times | |
|---|---|---|---|---|---|---|
| | Staphylococcus aureus antibacterial rate/% | Klebsiella pneumoniae/% | Staphylococcus aureus antibacterial rate/% | Klebsiella pneumoniae/% | Staphylococcus aureus antibacterial rate/% | Klebsiella pneumoniae/% |
| Embodiment 11 | >99% | >99% | >99% | >99% | >99% | >99% |
| Embodiment 12 | >99% | >99% | >99% | >99% | >99% | >99% |
| Embodiment 13 | >99% | >99% | >99% | >99% | >99% | >99% |
| Embodiment 14 | >99% | >99% | >99% | >99% | >99% | >99% |
| Embodiment 15 | >99% | >99% | >99% | >99% | >99% | >99% |

TABLE 3

Embodiments 11-15 durability test record sheet (solar radiation part)

| | 12 h | | 24 h | | 48 h | |
|---|---|---|---|---|---|---|
| | Staphylococcus aureus antibacterial rate/% | Klebsiella pneumoniae/% | Staphylococcus aureus antibacterial rate/% | Klebsiella pneumoniae/% | Staphylococcus aureus antibacterial rate/% | Klebsiella pneumoniae/% |
| Embodiment 11 | >99% | >99% | >99% | >99% | >99% | >99% |
| Embodiment 12 | >99% | >99% | >99% | >99% | >99% | >99% |
| Embodiment 13 | >99% | >99% | >99% | >99% | >99% | >99% |
| Embodiment 14 | >99% | >99% | >99% | >99% | >99% | >99% |
| Embodiment 15 | >99% | >99% | >99% | >99% | >99% | >99% |

As can be seen from Tables 1, 2 and 3, after conducting 50 times, 100 times and 500 times of washing and 12 h, 24 h and 48 h of simulated solar radiation, the antibacterial effect of the nylon yarns prepared according to Embodiments 11-15 on *staphylococcus aureus* and *klebsiella pneumoniae* was not significantly changed, indicating that the prepared nylon yarns have good durability against Gram-positive bacteria and Gram-negative bacteria.

Healthcare Function Tests

The nylon yarns prepared according to Embodiments 11-15 were tested with reference to CAS 115-2005 "Healthcare Textiles". The test results showed that the improvement of microcirculation perfusion in biological tissue was statistically significant (P<0.01), and far-infrared emissivity and negative ion emission measure are shown in Table 3.

TABLE 4

Embodiments 11-15 far-infrared emissivity and negative ion emission measure test record sheet

| | Far-infrared emissivity/% | Negative ion emission measure (/cm³) |
|---|---|---|
| Embodiment 11 | 91 | ≥3000 |
| Embodiment 12 | 93 | ≥3000 |
| Embodiment 13 | 94 | ≥3000 |
| Embodiment 14 | 92 | ≥3000 |
| Embodiment 15 | 90 | ≥3000 |

As can be seen from Table 4, Embodiments 11-15 have good far-infrared emission and negative ion emission functions and can improve microcirculation perfusion of biological tissue, indicating that the invention can promote blood circulation and enhance the anti-fatigue function.

Comparative Example 1

The difference between Comparative Example 1 and Embodiment 13 is that the color masterbatches is omitted, and others are the same as in Embodiment 13.

Comparative Example 2

The difference between Comparative Example 2 and Embodiment 13 is that the organic copper complex are omitted, and others are the same as in Embodiment 13.

Comparative Example 3

The difference between Comparative Example 3 and Embodiment 13 is that both the organic copper complex and the color masterbatches are omitted, and others are the same as in Embodiment 13.

Comparative Example 4

The difference between Comparative Example 4 and Embodiment 13 is that the chemical fiber oiling agent is changed to be an FDY2012 high-speed spinning oil agent manufactured by Nantong Hengrun New Material Technology Co., Ltd., and others are the same as in Embodiment 13.

Antibacterial tests were conducted on nylon yarns of Embodiment 13 and Comparative Examples 1-3 with reference to GB/T 20944.1-2007 "Textiles Evaluation for antibacterial activity Part 1: Agar diffusion plate method" and recorded.

TABLE 5

Embodiment 13 and Comparative Examples 1-3 antibacterial test record sheet

| | Staphylococcus aureus | | Klebsiella pneumoniae | |
|---|---|---|---|---|
| | Width of antibacterial belt/mm | bacterial growth condition under the test | Width of antibacterial belt/mm | bacterial growth condition under the test |
| Embodiment 13 | 3 | N/A | 4 | N/A |
| Comparative Example 1 | 1 | N/A | 1.5 | N/A |
| Comparative Example 2 | 0 | Medium | 0 | Medium |
| Comparative Example 3 | 0 | Massive | 0 | Massive |

As can be seen from Table 5, Comparative Example 3 does not have an antibacterial property, Comparative Example 2 has a weak antibacterial property, Comparative Example 1 has a good antibacterial property, and Embodiment 13 has the best antibacterial property, indicating that the antibacterial property of the nylon yarns when the organic copper complex and the color masterbatches are simultaneously added is better than the sum of the antibacterial properties of the nylon yarns when the organic copper complex and the color masterbatches are added independently.

Antibacterial tests were conducted on nylon yarns of Embodiment 13 and Comparative Example 4 with reference to GB/T 20994.2-2007 "Textiles-Evaluation for antibacterial activity-Part 2: Absorption method" and recorded.

Durability tests were conducted on Embodiment 13 and Comparative Example 4 according to the following test procedures and recorded.

Step 1: washing the nylon yarns prepared according to Embodiments 11-15 50 times with reference to GB/T 12490-2014 "Textiles-Tests for colour fastness-Colour fastness to domestic and commercial laundering", and then conducting antibacterial tests on the nylon yarns prepared according to Embodiments 11-15 with reference to GB/T 20994.2-2007 "Textiles-Evaluation for antibacterial activity-Part 2: Absorption method" and recording results;

Step 2: Changing the number of times of washing to 100 times and 500 times, with other operation the same as step 1;

Step 3: irradiating the nylon yarns prepared according to Embodiments 11-15 by using an air-cooled xenon arc lamp device to simulate solar radiation, wherein irradiation amount is 42 W/m$^2$, the distance between the air-cooled xenon arc lamp device and a sample surface is 5 cm, and irradiation time is 12 h;

Step 4: repeating step 2 with irradiation time being changed to 24 h and 48 h.

TABLE 6

Embodiment 13 and Comparative Examples 4 antibacterial test record sheet

| | Staphylococcus aureus antibacterial rate/% | Klebsiella pneumoniae/% |
|---|---|---|
| Embodiment 13 | >99% | >99% |
| Comparative Example 4 | >99% | >99% |

TABLE 7

Embodiment 13 and Comparative Examples 4 durability test record sheet (washing part)

| | 50 times | | 100 times | | 500 times | |
|---|---|---|---|---|---|---|
| | Staphylococcus aureus antibacterial rate/% | Klebsiella pneumoniae/% | Staphylococcus aureus antibacterial rate/% | Klebsiella pneumoniae/% | Staphylococcus aureus antibacterial rate/% | Klebsiella pneumoniae/% |
| Embodiment 13 | >99% | >99% | >99% | >99% | >99% | >99% |
| Comparative Example 4 | >99% | >99% | 97.5% | 98.2% | 95.7% | 96.4% |

TABLE 8

Embodiment 13 and Comparative Examples 4 durability test record sheet (solar radiation part)

| | 12 h | | 24 h | | 48 h | |
|---|---|---|---|---|---|---|
| | Staphylococcus aureus antibacterial rate/% | Klebsiella pneumoniae/% | Staphylococcus aureus antibacterial rate/% | Klebsiella pneumoniae/% | Staphylococcus aureus antibacterial rate/% | Klebsiella pneumoniae/% |
| Embodiment 13 | >99% | >99% | >99% | >99% | >99% | >99% |
| Comparative Example 4 | >99% | >99% | 97.2% | 98.6% | 96.2% | 97.3% |

As can be seen from Tables 6, 7 and 8, after conducting 50 times, 100 times and 500 times of washing and 12 h, 24 h and 48 h of simulated solar radiation, the antibacterial effect of the nylon yarns prepared according to Embodiment 13 on *staphylococcus aureus* and *klebsiella pneumoniae* was not significantly changed, while the antibacterial effect of Comparative Example 4 is reduced after washing and simulated solar radiation, indicating that compared with ordinary chemical fiber oiling agents, by adding the chemical fiber oiling agent of the invention, the prepared nylon yarns can have better durability against Gram-positive bacteria and Gram-negative bacteria.

The specific embodiments are merely explanations of the present invention, not intended to limit the present invention. Those skilled in the art may make any modifications without creative contribution to the embodiments as required after reading the present specification, and the modifications are protected by the patent law only within the scope of the claims of the present invention.

What is claimed is:

1. A method for preparing nylon yarns, comprising the following steps:
   step 1: mixing and blending an organic copper complex, color masterbatches and a PA6 slices for preparing the nylon yarns to form a spinning melt; and
   step 2: spinning, cooling and then winding the spinning melt into bobbins,
   wherein the organic copper complex is prepared according to the following steps:
      step A: uniformly mixing urea, caprolactam and acetamide, and then conducting heating and heat preservation till the caprolactam and the urea are uniformly melted and liquefied, so as to obtain a coordinated ionic liquid; and
      step B: adding a coordinated solid mixture containing sodium chlorate, potassium permanganate, sodium peroxide and copper powder to the coordinated ionic liquid to be stirred uniformly for reacting, and then cooling and pouring into pure water to obtain the organic copper complex;
   the color masterbatches are prepared according to the following steps:
      S1: mixing germanium powder with a dispersing agent polyethylene wax and a coupling agent titanate, stirring uniformly, and then conducting grinding to obtain germanium powder slurry;
      S2: mixing negative ion powder, far-infrared powder, a silane coupling agent and the dispersing agent polyethylene wax, and stirring uniformly to make the negative ion powder and the far-infrared powder fully dispersed, so as to obtain modified negative ion far-infrared powder;
      S3: mixing a PA6 slices for preparing the color masterbatches, the germanium powder slurry and the modified negative ion far-infrared powder; and
      S4: drying and conducting blending granulation.

2. The method for preparing the nylon yarns according to claim 1, wherein a weight ratio of the organic copper complex to the color masterbatches to the PA6 slices for preparing the nylon yarns in the step 1 is 0.5-2:5-10:90-95.

3. The method for preparing the nylon yarns according to claim 1, wherein the organic copper complex, the color masterbatches and the PA6 slices for preparing the nylon yarns are mixed and melted by a twin-screw extruder in the step 1, a temperature in each zone of the twin-screw extruder is set at 260-273° C., a screw diameter of the twin-screw extruder is 67 mm, and a ratio of a screw length to the screw diameter is 36:1.

4. The method for preparing the nylon yarns according to claim 1, wherein the spinning melt in the step 2 is spun through a spinneret, a pressure of the spinneret is 15-16 MPa, a side blowing speed is 40-42 m/min, a side blowing temperature is 19-20° C., a side blowing humidity is 80-85%, a spinning temperature is 259-265° C., a spinning pressure is 12-18 cN, and a spinning speed is 4000-4500 m/min; and in a spinning process, two nozzles are used for spraying a chemical fiber oiling agent emulsion with a concentration of 10-12 wt %, and a distance between the spinneret and the two nozzles is 1340-1360 mm.

5. The method for preparing the nylon yarns according to claim 1, wherein the PA6 slices for preparing the nylon yarns and the PA6 slices for preparing the color masterbatches are all spin-grade PA6 slices with a relative viscosity of 2.5.

6. The method for preparing the nylon yarns according to claim 1, wherein in the step A, a weight ratio of the urea to the caprolactam to the acetamide is 1:0.2-0.4:0.2-0.4, a heating temperature is 100-120° C., and after a temperature reaches 100-120° C., the heat preservation is conducted for 0.5-1 h till the caprolactam and the urea are uniformly melted and liquefied; in the step B, a weight ratio of the sodium chlorate to the potassium permanganate to the sodium peroxide to the copper powder is 1:1-2:1-2:2.5-2.9; and a weight ratio of the coordinated solid mixture to the coordinated ionic liquid is 1:3-3.5.

7. The method for preparing the nylon yarns according to claim 1, wherein in the S1, a weight ratio of the germanium powder to the dispersing agent polyethylene wax A1-5 to the coupling agent titanate is 1:0.1-0.3:0.4-0.6, and a grinding time is 10-20 min.

8. The method for preparing the nylon yarns according to claim 1, wherein in the S2, a weight ratio of the negative ion powder to the far-infrared powder to the silane coupling agent to the dispersing agent polyethylene wax is 1:1-1.2:0.2-0.6:0.1-0.3.

9. The method for preparing the nylon yarns according to claim 1, wherein in the S3, a weight ratio of the PA6 slices for preparing the color masterbatches to the germanium powder slurry to the modified negative ion far-infrared powder is 10:0.01-0.02:2-2.1.

10. The method for preparing the nylon yarns according to claim 1, wherein in the S4, a drying temperature is 100-105° C., and the blending granulation is conducted by a screw extruder at 260-300° C.

\* \* \* \* \*